US009208100B2

(12) United States Patent
Yao et al.

(10) Patent No.: US 9,208,100 B2
(45) Date of Patent: Dec. 8, 2015

(54) DIRECTORY REPLACEMENT METHOD AND DEVICE

(71) Applicant: Huawei Technologies Co., Ltd., Shenzhen, Guangdong (CN)

(72) Inventors: Ce Yao, Hangzhou (CN); Yafei Zhao, Hangzhou (CN); Jianrong Xu, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 166 days.

(21) Appl. No.: 13/682,891

(22) Filed: Nov. 21, 2012

(65) Prior Publication Data

US 2013/0151785 A1 Jun. 13, 2013

(30) Foreign Application Priority Data

Dec. 8, 2011 (CN) .......................... 2011 1 0405795

(51) Int. Cl.
*G06F 12/08* (2006.01)
*G06F 12/12* (2006.01)

(52) U.S. Cl.
CPC .......... *G06F 12/0891* (2013.01); *G06F 12/082* (2013.01); *G06F 12/0831* (2013.01); *G06F 12/12* (2013.01)

(58) Field of Classification Search
CPC . G06F 12/0891; G06F 12/12; G06F 2219/69; G06F 12/121; G06F 12/0815; G06F 12/0828; G06F 12/0817; G06F 2212/621
USPC .......................................... 711/133, 141, 146
See application file for complete search history.

(56) References Cited

U.S. PATENT DOCUMENTS

| | | | |
|---|---|---|---|
| 6,598,123 | B1 | 7/2003 | Anderson et al. |
| 8,327,228 | B2 | 12/2012 | Kumar et al. |
| 2003/0093722 | A1 | 5/2003 | Shanahan et al. |
| 2010/0332762 | A1 | 12/2010 | Moga et al. |
| 2011/0078384 | A1 | 3/2011 | Kumar et al. |

FOREIGN PATENT DOCUMENTS

| | | | |
|---|---|---|---|
| CN | 101937401 | A | 1/2011 |
| CN | 102033715 | A | 4/2011 |
| CN | 102033817 | A | 4/2011 |
| EP | 0818732 | A2 | 1/1998 |

OTHER PUBLICATIONS

Extended European Search Report in corresponding European Patent Application No. 12193965.6 (Jul. 23, 2013).

*Primary Examiner* — Jasmine Song
(74) *Attorney, Agent, or Firm* — Leydig, Voit & Mayer, Ltd.

(57) ABSTRACT

The present invention provides a directory replacement method and device. An HA receives a data access request including a first address from a first CA, if a designated storage where a directory is located is entirely occupied by the directory, and a first directory entry corresponding to the first address is not in the directory, the HA selects a second directory entry from the directory, deletes it and adds the first directory entry into the directory; before the HA replaces the directory entry in the directory, no matter what status (for example, I status, S status or A status) a share status of a cache line corresponding to an address in the directory entry to be replaced is, the HA does not need to request a corresponding CA to perform an invalidating operation on data, but directly replaces the directory entry in the directory, thereby improving replacement efficiency.

8 Claims, 3 Drawing Sheets

An HA receives a data access request, which includes a first address, from a first CA, where the data access request is used to access data in a first storage or a second storage corresponding to the first address — 101

If a designated storage with preset capacity, where a directory is located, is entirely occupied by the directory, and a first directory entry corresponding to the first address is not in the directory, the HA selects a second directory entry from the directory — 102

The HA deletes the second directory entry from the directory, and adds the first directory entry into the directory — 103

DIRECTORY REPLACEMENT METHOD AND DEVICE

CROSS-REFERENCE TO RELATED APPLICATION

This application claims priority to Chinese Patent Application No. 201110405795.0, filed on Dec. 8, 2011, which is hereby incorporated by reference in its entirety.

FIELD OF THE INVENTION

The present invention relates to data access technologies, and in particular, to a directory replacement method and device.

BACKGROUND OF THE INVENTION

A non-uniform memory access (Non-Uniform Memory Access, referred to as NUMA) system may include multiple interconnected nodes, and each node is formed of a node controller (Node Controller, referred to as NC) and multiple central processing units (Central Processing Unit, referred to as CPU). Coherence of data between each cache (Cache) is maintained by using a cache coherence (Cache Coherence, referred to as CC) protocol based on a directory inside a node. Because large storage space is needed to store the directory, not all directory entries corresponding to all addresses can be stored into a cache. In the prior art, the directory entries corresponding to part of the addresses may be stored in the cache. When the foregoing cache is entirely occupied by a directory, and a directory entry which corresponds to an address that currently needs to be accessed is not in the directory, a home agent (Home Agent, referred to as HA) selects a directory entry from the directory; if a share status of a CA to a cache line (Cache Line) corresponding to an address in the directory entry is shared (that is, S) status or Any (that is, A) status, the HA sends a snoop (Snoop) request message to the CA, so as to request the CA to perform an invalidating operation on the cache line corresponding to the address in the directory entry to make the shared status, to the CA, of the cache line corresponding to the address in the directory entry be in an invalid (that is, I) status, and then deletes the directory entry from the directory and adds the directory entry which corresponds to the address that currently needs to be accessed into the directory.

However, before the HA replaces a directory entry in a directory, if the share status of a cache line corresponding to an address in the directory entry to be replaced is the S status or the A status, the HA needs to request a corresponding CA to perform an invalidating operation on the data, thereby resulting in a decrease of replacement efficiency.

SUMMARY OF THE INVENTION

The present invention provides a directory replacement method and device, so as to improve replacement efficiency.

In one aspect, a directory replacement method is provided, including:

receiving, by an HA, a data access request, which includes a first address, from a first CA;

if a designated storage with preset capacity where a directory is located, is entirely occupied by the directory, and a first directory entry corresponding to the first address is not in the directory, selecting, by the HA, a second directory entry from the directory; and deleting, by the HA, the second directory entry from the directory, and adding the first directory entry corresponding to the first address into the directory.

In another aspect, a directory replacement device is provided, including:

a receiving unit, configured to receive a data access request, which includes a first address, from a first CA;

a selecting unit, configured to, if a designated storage with preset capacity, where a directory is located, is entirely occupied by the directory, and a first directory entry corresponding to the first address is not in the directory, select a second directory entry from the directory; and a replacing unit, configured to delete the second directory entry from the directory and add the first directory entry corresponding to the first address into the directory.

In another aspect, a directory replacement device is provided, including a processor configured to implement a method comprising:

receiving a data access request, which comprises a first address, from a first CA;

if a designated storage with preset capacity, where a directory is located, is entirely occupied by the directory, and a first directory entry corresponding to the first address is not in the directory, selecting a second directory entry from the directory; and deleting the second directory entry from the directory, and adding the first directory entry corresponding to the first address into the directory.

From the foregoing technical solutions, it may be known that in the embodiments of the present invention, after the HA receives the data access request, which includes the first address, from the first CA, if the designated storage with the preset capacity, where the directory is located, is entirely occupied by the directory, and the first directory entry corresponding to the first address is not in the directory, the HA selects the second directory entry from the directory, so as to enable the second directory entry to be deleted from the directory, and adds the first directory entry into the directory; before the HA replaces the directory entry in the directory, no matter what status (for example, I status, S status or A status) a share status of a cache line corresponding to the address in the directory entry to be replaced is, the HA does not need to request the corresponding CA to perform an invalidating operation on the data, but directly replaces the directory entry in the directory, thereby improving the replacement efficiency.

BRIEF DESCRIPTION OF THE DRAWINGS

To illustrate the technical solutions in embodiments of the present invention or in the prior art more clearly, the following briefly introduces accompanying drawings needed for describing the embodiments or the prior art. Obviously, the accompanying drawings in the following description are some embodiments of the present invention, and persons of ordinary skill in the art may obtain other drawings from these accompanying drawings without making creative efforts.

DETAILED DESCRIPTION OF THE EMBODIMENTS

To make the objectives, technical solutions, and advantages of the present invention clearer, the following clearly and completely describes the technical solutions according to the embodiments of the present invention with reference to the accompanying drawings in the embodiments of the present invention. Obviously, the described embodiments are part of rather than all of the embodiments of the present invention. All other embodiments obtained by persons of ordinary skill in the art based on the embodiments of the present invention without making creative efforts shall fall within the protection scope of the present invention.

Figure 1:
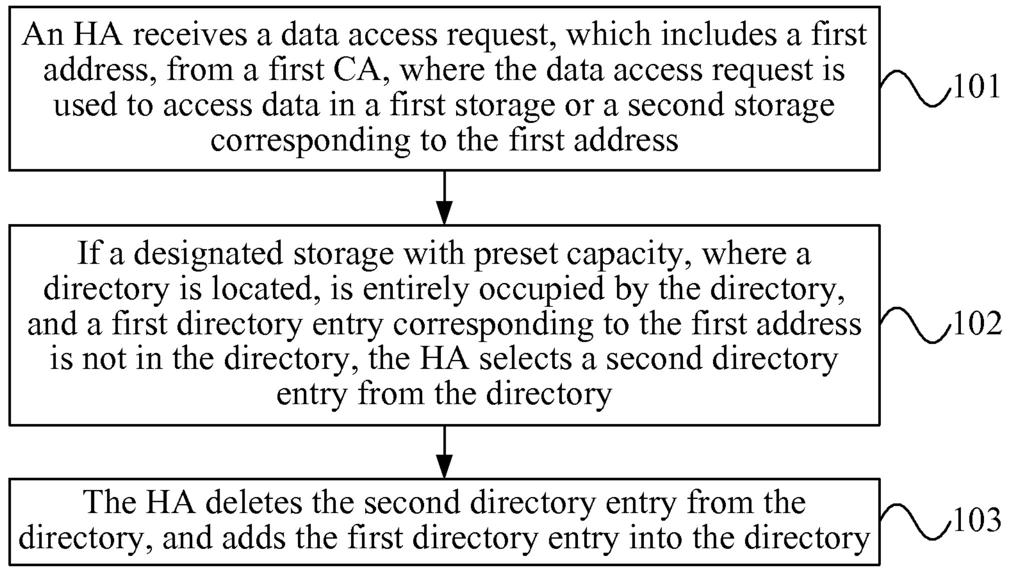
FIG. 1 is a schematic flowchart of a directory replacement method according to an embodiment of the present invention.

FIG. 1 is a schematic flowchart of a directory replacement method according to an embodiment of the present invention, and as shown in FIG. 1, the directory replacement method in the embodiment may include:

101: An HA receives a data access request, which includes a first address, from a first CA, where the data access request is used to access data in a first storage or a second storage corresponding to the first address;

Optionally, the first storage and the second storage may be non-volatile storage, such as solid-state hard disks, standard flash memories, secure digital (Secure Digital, referred to as SD) cards, hard disks, and so on.

Optionally, the first storage and the second storage may also be volatile storages, such as double data rate synchronous dynamic random access memories (Double Data Rate Synchronous Dynamic Random Access Memory, referred to as DDR-SDRAM) and so on.

102: If a designated storage with preset capacity, where a directory is located, is entirely occupied by the directory, and a first directory entry corresponding to the first address is not in the directory, the HA selects a second directory entry from the directory.

Optionally, the designated storage may be a non-volatile storage, such as a solid-state hard disk, a standard flash memory, an SD card, a hard disk, and so on.

Optionally, the designated storage may also be a volatile storage, such as a DDR-SDRAM and so on.

It may be understood that, the first storage or the second storage may implement storage of the data in a form of a storage unit. The designated storage may be an independent storage inside a system, or may be a storage unit of the first storage or a storage unit of the second storage.

Further, the HA may select the second directory entry from the directory in multiple manners:

For example, if a selectable directory entry corresponding to a second address exists in the directory, and a share status of each second CA to a cache line corresponding to the second address is I status, the HA selects the selectable directory entry corresponding to the second address as the second directory entry.

For another example, if a selectable directory entry corresponding to the second address does not exist in the directory, but a selectable directory entry corresponding to a third address exists, and among all second CAs, the number of the second CA, whose share status to a cache line corresponding to the third address is S status, is the largest, the HA selects the selectable directory entry corresponding to the third address as the second directory entry.

For another example, if neither the selectable directory entry corresponding to the second address nor the selectable directory entry corresponding to the third address exists in the directory, the HA selects a selectable directory entry corresponding to a fourth address as the second directory entry.

103: The HA deletes the second directory entry from the directory, and adds the first directory entry into the directory.

It may be understood that, in the embodiment, when the first CA accesses an address which is not in the directory, the HA may consider the share status of a second CA to a cache line corresponding to the address as A status, so that the HA may perform corresponding processing, where the second CA may be another CA in a NUMA system except the first CA, the number of the second CAs may be one, or more than one, and the embodiment does not limit this.

For example, in the embodiment, if the data access request received by the HA is a share data request, and accordingly, if the designated storage is entirely occupied by the directory and the first directory entry corresponding to the first address is not in the directory, the HA may broadcast a first snoop request message to all the second CAs to request for obtaining information of a share status of each second CA, to a cache line corresponding to the first address; and then, the HA may provide data corresponding to the address to the first CA, according to a response message returned by each second CA according to the share status of the second CA to the cache line corresponding to the address.

For example, in the embodiment, if the data access request received by the HA is an exclusive data request, and accordingly, if the designated storage is entirely occupied by the directory and the first directory entry corresponding to the first address is not in the directory, the HA may broadcast a second snoop request message to all the second CAs to request each second CA to perform an invalidating operation on a cache line corresponding to the first address shared by each second CA, then, the HA may provide data corresponding to the address to the first CA, or may write new data into a storage unit or a cache line in a memory corresponding to the address.

Optionally, if an address further exists in the directory, and the share status of the first CA or a second CA, to a cache line corresponding to the address is S status, and, if the HA receives a data access request to access the address, the HA may directly provide data in a memory corresponding to the address to a requester, or may also provide the data in the memory corresponding to the address to the requester or write new data into a storage unit in the memory corresponding to the address. Specifically, a flag bit DIR_ME_FULL may be used to identify whether the address exists in the directory, for example, if DIR_ME_FULL=0, the address exists in the directory; if DIR_ME_FULL=1, the address does not exist in the directory; and vice versa. Further, for the share data request, a directory entry corresponding to the address may not to be updated.

In the embodiment, after the HA receives the data access request, which includes the first address, from the first CA, if the designated storage with the preset capacity, where the directory is located, is entirely occupied by the directory, and the first directory entry corresponding to the first address is not in the directory, the HA selects the second directory entry from the directory so as to enable the second directory entry to be deleted from the directory, and adds the first directory entry into the directory; before the HA replaces the directory entry in the directory, no matter what status (for example, the I status, S status or A status) the share status of the cache line corresponding to the address in the directory entry to be replaced is, the HA does not need to request a corresponding CA to perform the invalidating operation on the data, but directly replaces the directory entry in the directory, thereby improving replacement efficiency.

Figure 2:
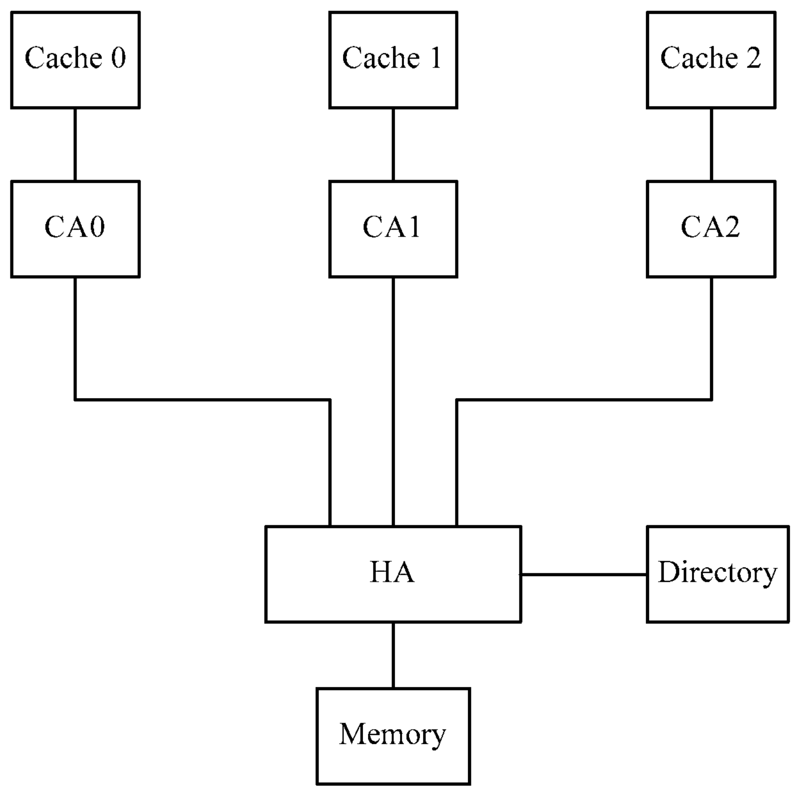
FIG. 2 is a schematic structural diagram of topology of a NUMA system.
Figure 3:
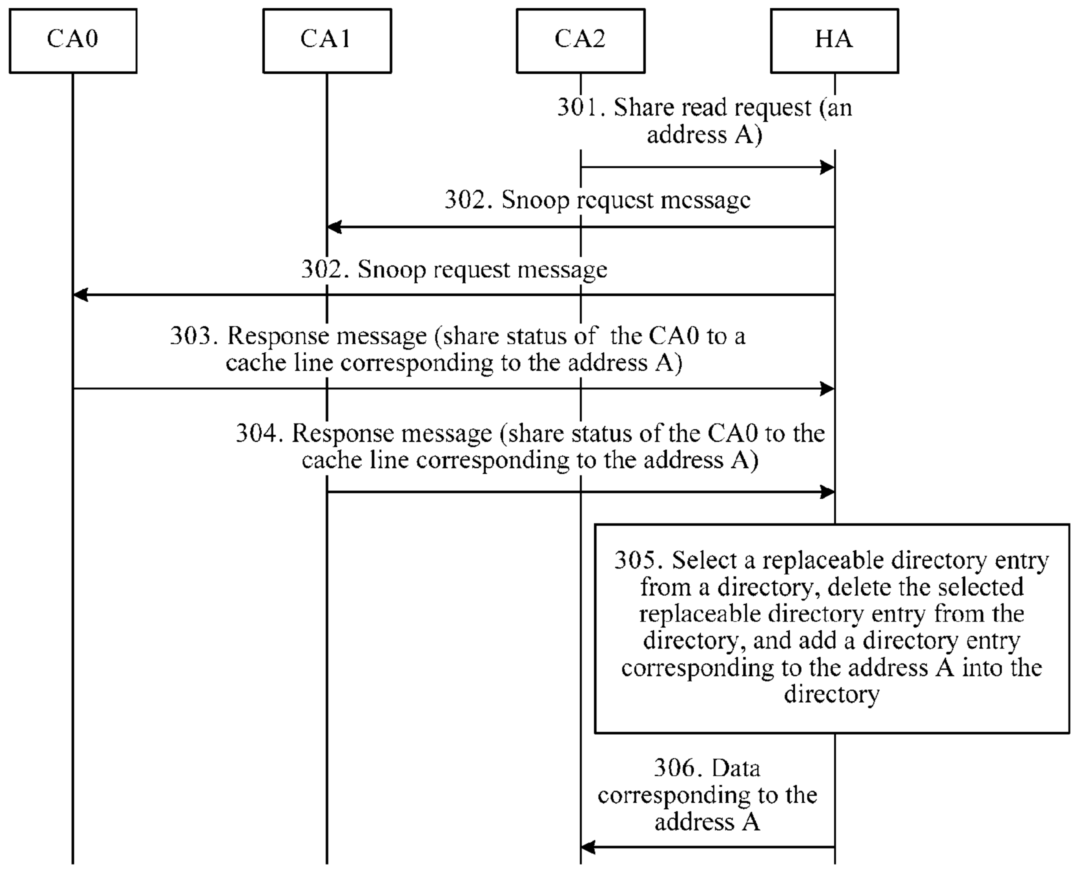
FIG. 3 is a schematic flowchart of a directory replacement method according to another embodiment of the present invention.

The technical solution provided in the embodiment of the present invention may be applicable to any CC protocol based on the directory. To make the method provided in the embodiment of the present invention clearer, the following takes a quick path interconnect (Quick Path Interconnect, referred to as QPI) CC protocol as an example. FIG. 2 is a schematic structural diagram of topology of the NUMA system, and as shown in FIG. 2, the following assumptions may be made: that share statuses, of a CA0 and a CA2, to a cache line corresponding to an address A are I status indicates that the cache line includes no data or includes no invalid data; that a share status, of a CA1 to the cache line corresponding to the address A is S status means that the data is effective; and storage space (that is, a designated storage such as a cache) occupied by the directory is used up. FIG. 3 is a schematic flowchart of a directory replacement method according to another embodiment of the present invention, and as shown in FIG. 3, the directory replacement method in the embodiment may include:

301: A CA2 sends a share read request including an address A to an HA, so as to access data in a storage unit or a cache line in a memory corresponding to the address A.

302: If a directory entry corresponding to the address A is not in a directory, the HA broadcasts a snoop request message to a CA0 and a CA1, so as to inform the CA0 and the CA1 that, the CA2 pre-accesses the data in the storage unit or the cache line in the memory corresponding to the address A.

303: The CA0 returns a corresponding response message to the HA according to a share status, that is I status, of the CA0 to the cache line corresponding to the address A, where the response message includes the share status of the CA0 to the cache line corresponding to the address A.

304: The CA1 returns a corresponding response message to the HA according to a share status, that is S status, of the CA1 to the cache line corresponding to the address A, where the response message includes the share status of the CA1 to the cache line corresponding to the address A.

It may be understood that, execution of the foregoing 303 and 304 does not follow a fixed order, and the embodiment does not limit this.

305: The HA selects a replaceable directory entry from the directory, deletes the selected replaceable directory entry from the directory, and adds the directory entry corresponding to the address A into the directory;

Reference may be made to the related description in the embodiment corresponding to FIG. 1 for a specific selection manner, which is not repeatedly described here.

306: The HA provides the data corresponding to the address A to the CA2 according to the response messages returned by the CA0 and the CA1.

In the embodiment, after the HA receives the share read request, which includes the address A, from the CA2, if a designated storage with preset capacity, where the directory is located, is entirely occupied by the directory, and the directory entry corresponding to the address A is not in the directory, the HA selects the replaceable directory entry from the directory, so as to enable the replaceable directory entry to be deleted from the directory, and adds the directory entry corresponding to the address A into the directory; before the HA replaces the directory entry in the directory, no matter what status (for example, I status, S status or A status) the share status of the cache line corresponding to the address in the directory entry to be replaced is, the HA does not need to request the corresponding CA to perform an invalidating operation on the data, but directly replaces the directory entry in the directory, thereby improving replacement efficiency.

It should be noted that, for brevity of description, the foregoing method embodiments are described in a series of actions. However, those skilled in the art should know that the present invention is not limited to the order of the described actions, because according to the present invention, some certain steps may adopt other orders or be performed simultaneously. It should be further known by persons skilled in the art that the described embodiments all belong to exemplary embodiments, and the involved actions and modules are not necessary for the present invention.

In the foregoing embodiments, the description of each embodiment has its emphasis, and reference may be made to the related description of other embodiments for the part that is not described in detail in a certain embodiment.

Figure 4:
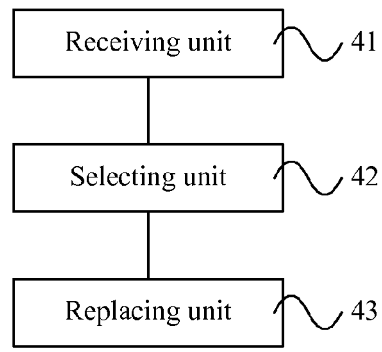
FIG. 4 is a schematic structural diagram of a directory replacement device according to another embodiment of the present invention.

FIG. 4 is a schematic structural diagram of a directory replacement device according to another embodiment of the present invention, and a receiving unit 41, a selecting unit 42 and a replacing unit 43 of the embodiment are as shown in FIG. 4. The receiving unit 41 is configured to receive a data access request, which includes a first address, from a first CA, where the data access request is used to access data in a first storage or a second storage corresponding to the first address; the selecting unit 42 is configured to, if a designated storage with preset capacity, where a directory is located, is entirely occupied by a directory, and a first directory entry corresponding to the first address is not in the directory, select a second directory entry from the directory; and the replacing unit 43 is configured to delete the second directory entry, which is selected by the selecting unit 42, from the directory, and add the first directory entry into the directory.

Functions of the HA in the foregoing embodiments corresponding to FIG. 1 and FIG. 3 may all be implemented by the directory replacement device provided in this embodiment of the present invention.

Further, the selecting unit 42 in the embodiment may select the second directory entry from the directory in multiple manners.

For example, if a selectable directory entry corresponding to a second address exists in the directory, and share status of each second CA to a cache line corresponding to the second address is I status, the selecting unit 42 selects the selectable directory entry corresponding to the second address as the second directory entry.

For another example, if the selectable directory entry corresponding to the second address does not exist in the directory, but a selectable directory entry corresponding to a third address exists, and among all the second CAs, the number of second CAs, each of whose share status to a cache line corresponding to the third address is S status, is the largest, the selecting unit 42 selects the selectable directory entry corresponding to the third address as the second directory entry.

For another example, if neither the selectable directory entry corresponding to the second address nor the selectable directory entry corresponding to the third address exists in the directory, the selecting unit 42 selects a selectable directory entry corresponding to a fourth address as the second directory entry.

It may be understood that, in the embodiment, when the first CA accesses an address which is not in the directory, the directory replacement device may consider the share status of a second CA to a cache line corresponding to the address as A status, so that the directory replacement device may perform corresponding processing, where the second CA may be another CA in a NUMA system except the first CA, the number of the second CAs may be one, or more than one, and the embodiment does not limit this.

Figure 5:
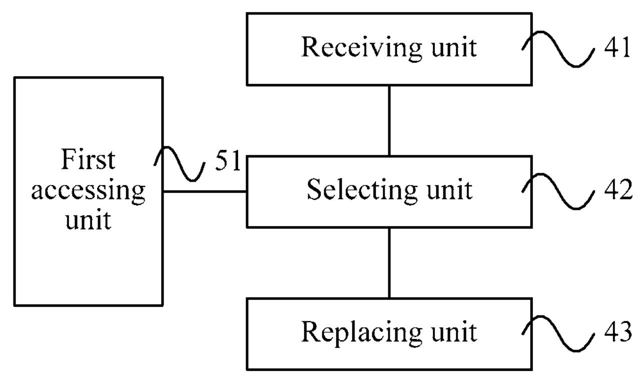
FIG. 5 is a schematic structural diagram of a directory replacement device according to another embodiment of the present invention.

For example, in the embodiment, if the data access request received by the HA is a share data request, accordingly, as shown in FIG. 5, the directory replacement device of the embodiment may further include a first accessing unit 51, configured to, if the designated storage is entirely occupied by the directory and the first directory entry corresponding to the first address is not in the directory, broadcast a snoop request message to all the second CAs, so as to make a request for obtaining information of a share status of the second CA to a cache line corresponding to the first address.

Figure 6:
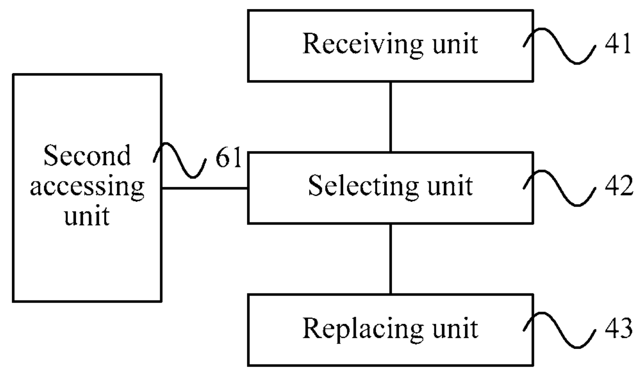
FIG. 6 is a schematic structural diagram of a directory replacement device according to another embodiment of the present invention.

For example, in the embodiment, if the data access request received by the HA is an exclusive data request, accordingly, as shown in FIG. 6, the directory replacement device of the embodiment may further include a second accessing unit 61, configured to, if the designated storage is entirely occupied by the directory and the first directory entry corresponding to the first address is not in the directory, broadcast a second snoop request message to all the second CA, so as to request each second CA to perform an invalidating operation on a cache line corresponding to the first address shared by the second CA.

It may be understood that, the first storage or the second storage may implement storage of data in a form of a storage unit. The designated storage may be an independent storage inside the system, or may also be a storage unit of the first storage or a storage unit of the second storage.

In the embodiment, after the directory replacement device receives the share read request, which includes an address A, from a CA2 through the receiving unit, if the designate storage with the preset capacity, where the directory is located, is entirely occupied by the directory, and a directory entry corresponding to the address A is not in the directory, the selecting unit selects a replaceable directory entry from the directory, so that the replacing unit can delete the replaceable directory entry from the directory and add the directory entry corresponding to the address A into the directory; before the HA replaces the directory entry in the directory, no matter what status (for example, I status, S status or A status) a share status of a cache line corresponding to the address in the directory entry to be replaced is, the HA does not need to request the corresponding CA to perform the invalidating operation on the data, but directly replaces the directory entry in the directory, thereby improving replacement efficiency.

It may be clearly understood by persons skilled in the art that, for convenience and brevity of description, reference may be made to the corresponding process in the foregoing method embodiments for a specific working process of the foregoing system, apparatus and unit, which is not repeatedly described here.

In the several embodiments provided in the present application, it should be understood that the disclosed system, apparatus, and method may be implemented in other manners. For example, the foregoing described apparatus embodiments are merely exemplary. For example, division of the units is merely a kind of logical function division and there may be other division manners in practical implementation. For example, multiple units or components may be combined or integrated into another system, or some features may be ignored or not executed. In addition, the displayed or discussed mutual couplings or direct couplings or communication connections may be indirect couplings or communication connections through some interfaces, apparatuses or units, and may be in electronic, mechanical or other forms.

The units described as separate parts may or may not be physically separate, and parts displayed as units may or may not be physical units, may be located in one position, or may be distributed on multiple network elements. Part of or all of the units may be selected according to a practical need to achieve the objectives of the solutions of the embodiments.

In addition, function units in the embodiments of the present invention may be integrated into a processing unit, or each of the units may exist alone physically, or two or more than two units are integrated into one unit. The integrated unit may be implemented in a form of hardware, or may be implemented in a form of hardware plus a software functional unit.

The integrated unit implemented in the form of software functional unit may be stored in a computer readable storage medium. The software functional unit is stored in a storage medium, and includes several instructions for instructing a computer device (which may be a personal computer, a server, or a network device, and the like) to execute part of the steps of the methods described in the embodiments of the present invention. The storage medium includes: various media that may store program codes, such as a U disk, a removable hard disk, a read-only memory (Read-Only memory, referred to as ROM), a random access memory (Random Access Memory, referred to as RAM), a magnetic disk, or a compact disk and the like.

Finally, it should be noted that the embodiments of the present invention are merely used for describing the technical solutions of the present invention, but are not intended to limit it. Although the present invention is described in detail with reference to the foregoing embodiments, persons of ordinary skill in the art should understand that they may still make modifications to the technical solutions described in the foregoing embodiments, or make replacements to part of the technical features, while such modifications or replacements do not make the nature of corresponding technical solutions depart from the spirit and scope of the technical solutions of the embodiments of the present invention.

What is claimed is:

1. A directory replacement method, comprising:

receiving, by a home agent, a data access request from a first cache agent, the data access request comprising a first address corresponding to a first directory entry;

selecting, by the home agent, a second directory entry from a directory if a designated storage with preset capacity is entirely occupied by the directory, and the first directory entry corresponding to the first address is not in the directory, wherein an address for the second directory entry is a third address when a quantity of second cache agents whose share status to a cache line corresponding to the third address is S status is the largest; and deleting, by the home agent, the second directory entry from the directory, and adding the first directory entry corresponding to the first address into the directory.

2. The method according to claim 1, wherein the data access request is a share data request, and the method further comprises:

broadcasting, by the home agent, a first snoop request message to all second cache agents to request for obtaining information of a share status of each second cache agent to a cache line corresponding to the first address;

receiving, by the home agent, a response message from each the second cache agent, wherein the response message includes the share status of the second cache agent to the cache line corresponding to the first address; and providing, by the home agent, data corresponding to the first address to the first cache agent.

3. The method according to claim 1, wherein the data access request is an exclusive data request, and the method further comprises:

broadcasting, by the home agent, a second snoop request message to all second cache agents to request each second cache agents perform an invalidating operation on a cache line corresponding to the first address shared by the second cache agents; and providing, by the home agent, data corresponding to the first address to the first cache agent, or writing, by the home agent, new data into a cache line corresponding to the first address.

4. The method according to claim 1, wherein the data access request is an exclusive data request, and the method further comprises:

broadcasting, by the home agent, a second snoop request message to all the second cache agents to request each the second cache agents perform an invalidating operation on a cache line corresponding to the first address shared by the second cache agents; and writing, by the home agent, new data into a cache line corresponding to the first address.

5. A directory replacement device, comprising:

a processor configured to:

receive a data access request from a first cache agent, the data access request comprising a first address corresponding to a first directory entry;

select a second directory entry from the directory if a designated storage with preset capacity is entirely occupied by the directory and the first directory entry corresponding to the first address is not in the directory, wherein an address for the second directory entry is a third address when a quantity of second cache agents whose share status to a cache line corresponding to the third address is S status is the largest; and delete the second directory entry from the directory, and add the first directory entry corresponding to the first address into the directory.

6. The device according to claim 5, wherein the data access request is a share data request, and the processor is configured to broadcast a first snoop request message to all second cache agents to request for obtaining information of a share status of each second cache agent to a cache line corresponding to the first address; receive a response message from each the second cache agent, wherein the response message includes the share status of the second cache agent to the cache line corresponding to the first address; and provide data corresponding to the first address to the first cache agent.

7. The device according to claim 5, wherein the data access request is an exclusive data request, and the processor is configured to broadcast a second snoop request message to all second cache agents to request each second cache agents to perform an invalidating operation on a cache line corresponding to the first address shared by the second cache agents, and provide data corresponding to the first address to the first cache agent, or writing, by the home agent, new data into a cache line corresponding to the first address.

8. The device according to claim 5, wherein the data access request is an exclusive data request, and the processor is configured broadcast a second snoop request message to all the second cache agents to request each the second cache agents perform an invalidating operation on a cache line corresponding to the first address shared by the second cache agents;

writing, by the home agent, new data into a cache line corresponding to the first address.

* * * * *